(No Model.)
B. C. BRADLEY.
CASTER COLTER.
No. 285,790. Patented Oct. 2, 1883.
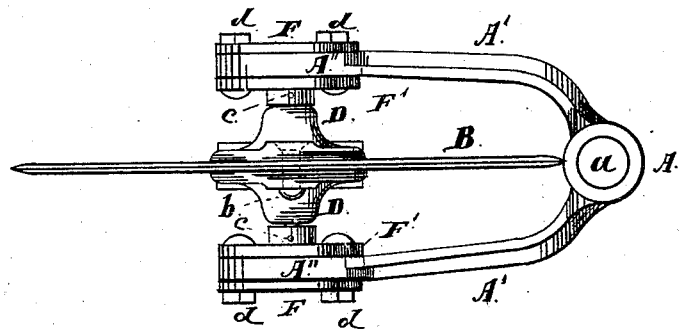
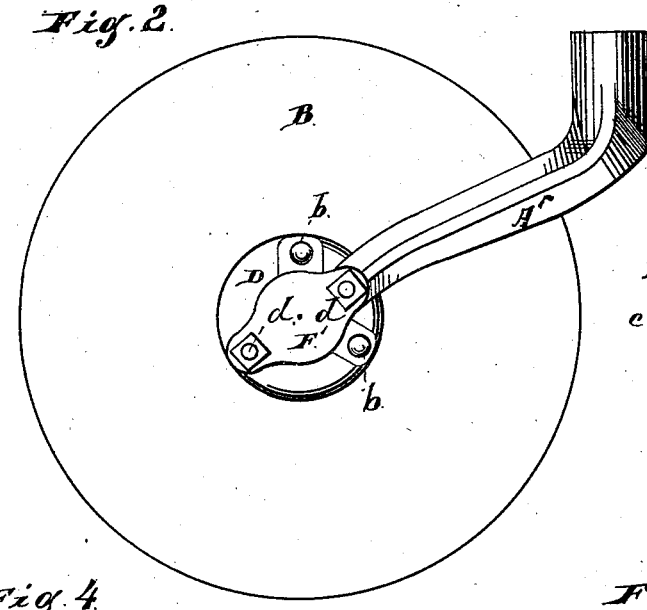
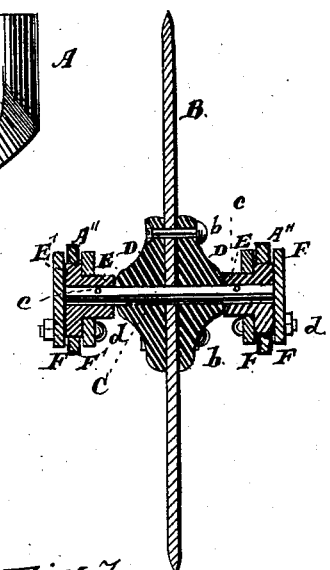
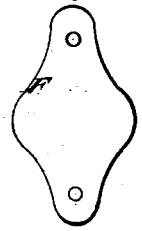
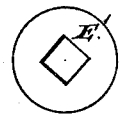
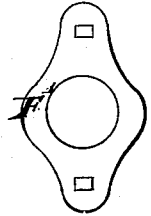
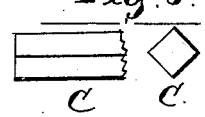
Witnesses:
Inventor:
Byron C. Bradley,
By West & Bond
His Attys.

UNITED STATES PATENT OFFICE.

BYRON C. BRADLEY, OF CHICAGO, ILLINOIS, ASSIGNOR TO THE FURST & BRADLEY MANUFACTURING COMPANY, OF SAME PLACE.

CASTER-COLTER.

SPECIFICATION forming part of Letters Patent No. 285,790, dated October 2, 1883.

Application filed March 20, 1883. (No model.)

*To all whom it may concern:*

Be it known that I, BYRON C. BRADLEY, residing at Chicago, in the county of Cook and State of Illinois, and a citizen of the United States, have invented a new and useful Improvement in Caster-Colters, of which the following is a full description, reference being had to the accompanying drawings, in which—

Figure 1 is a top or plan view; Fig. 2, a side elevation; Fig. 3, a vertical cross-section through the axle, fork, and blade; Figs. 4, 5, 6, and 7, details of the tubular journal or collar and its holding-plates; Fig. 8, a detail of the axle.

This invention relates to what are known or termed "rolling" or "caster" colters, and has for its object to improve the mounting or supporting of the blade in its fork, so as to give a greater bearing-surface and hold the blade more firmly in use; and its nature consists in the several devices, hereinafter described, and pointed out in the claims, for attaining the desired object.

In the drawings, A represents the socket portion of the fork, and A' the arms or sides of the fork, the ends A'' of which are enlarged and of a circular or ring shape. The socket A is provided with an opening, $a$, for swiveling the fork to a pin, in the usual manner.

B is the blade, of any of the usual and well-known forms of construction, having at its center a square opening for the passage of the shaft.

C is the shaft, made of iron or other suitable material, and rectangular or square in cross-section in the form shown.

D are plates of a circular form, one applied to each side of the blade and secured thereto by means of rivets $b$, or in some other suitable manner, each plate having at its center an elongated portion to give the blade a firm bearing and support, and each having a central longitudinal opening, corresponding in shape and size to the shape and size of the shaft C.

E are collars, each having an enlarged portion, E', of a disk or circular form, which forms the journals for the shaft. These collars E are located one on each side of the plates D in contact with the end of the elongated portion, and are each secured to the shaft C by means of a pin or key, $c$, so as to maintain the blade against lateral movement on the shaft C. The heads or journals E' correspond in diameter to the diameter of the hole in the heads or rings A'', in which they are supported and have their bearing.

F F' are plates, one on each side of each head or ring A'', and secured to the head or ring by means of bolts $d$, or in some other suitable manner. The outer plate, F, is solid or entire, and the inner plate, F', is provided with an opening corresponding in size to the diameter of the collar E, and these plates F F' form guards, when in place, to hold the journals E in their rings or heads A'', so as to prevent any lateral thrust of the shaft.

In putting the device together the blade B, with its collars or plates D, are slipped upon the shaft C. The inner plates, F', are slipped upon the collars E against the heads E', and the collars E are slipped upon the axle and secured in place by the pins or keys $c$, one collar being first secured in place and the other collar being left loose to allow the heads E' to be slipped in their rings or bearings A'', and after both heads are in place the other collar is secured by its pin or key $c$. The plates F on the outside are then placed in position and secured to the rings by bolts $d$, the inner plates being brought into position for these bolts to attach them to their respective heads or rings.

This construction enables a square shaft to be used on which to mount the blade, dispensing with the use of any splines, keys, set-screws, or other devices to hold the blade firm, as is the case where a round shaft is used, and the heads or journals E', being enlarged, furnish a larger bearing-surface for rotation, and also furnish the means, in connection with the plates F F', to prevent any lateral thrust of the shaft, and these journals, being essentially covered by the plates F F', are not exposed to the action of dirt, sand, and other material, which otherwise would enter and cause a rapid wearing away or grinding of the journals, the plates forming what might be termed a "sand-guard" against the entrance of any material that would injure or wear the journals.

The devices are very simple in construction and can be readily attached, and when the parts are together the blade will have a firmer and stronger bearing by reason of the enlarged journals, the square shaft, and the absence of lateral thrust.

A square axle is shown, but it is evident that a rectangular or other shape, having flat faces or a flat surface of sufficient width to furnish a lock against the turning of the colter on the axle, could be used, it being understood that the opening through the colter, its hub, and the tubular bearings or collars E E' being of a shape corresponding to the shape of the axle.

What I claim as new, and desire to secure by Letters Patent, is—

1. The combination, with the axle, of the separately-formed collars E, fitted over the ends of the axle, and provided with the enlarged head E', adapted to fit the ends of the colter-forks, substantially as described.

2. The combination of the axle, the separately-formed collars E, fitted over the ends of the axle and having enlarged heads E', and the colter-fork having arms A', enlarged at their ends, and having their bearings on the enlarged heads of the collars.

3. The collars E, having the heads E', shaft C, collars D, and blade B, in combination with the fork A A' A'' and plates F F', substantially as and for the purposes specified.

BYRON C. BRADLEY.

Witnesses:
ALBERT H. ADAMS,
O. W. BOND.